US012730844B2

(12) United States Patent
Sen et al.

(10) Patent No.: US 12,730,844 B2
(45) Date of Patent: Sep. 8, 2026

(54) SELF-SUPERVISION IN TABLE QUESTION ANSWERING

(71) Applicant: International Business Machines Corporation, Armonk, NY (US)

(72) Inventors: Jaydeep Sen, Bangalore (IN); Saneem Ahmed Chemmengath, Bangalore (IN); Samarth Bharadwaj, Bangalore (IN); Vishwajeet Kumar, Bangalore (IN); Mustafa Canim, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 305 days.

(21) Appl. No.: 17/216,065

(22) Filed: Mar. 29, 2021

(65) Prior Publication Data

US 2022/0309107 A1 Sep. 29, 2022

(51) Int. Cl.
*G06F 16/9032* (2019.01)
*G06F 9/54* (2006.01)
(Continued)

(52) U.S. Cl.
CPC ........ *G06F 16/90332* (2019.01); *G06F 9/547* (2013.01); *G06F 40/20* (2020.01); *G06N 20/00* (2019.01)

(58) Field of Classification Search
CPC .... G06F 16/90332; G06F 40/20; G06F 9/547; G06N 20/00
(Continued)

(56) References Cited

U.S. PATENT DOCUMENTS

2016/0005325 A1 1/2016 Bagchi et al.
2016/0179934 A1* 6/2016 Stubley ................ G06F 16/243 707/722

(Continued)

FOREIGN PATENT DOCUMENTS

CN 108733712 B 11/2018
CN 113535916 A 10/2021

OTHER PUBLICATIONS

Mell, Peter, et al., The NIST Definition of Cloud Computing, National Institute of Standards and Technology, U.S. Department of Commerce, NIST Special Publication 800-145, Sep. 2011.

(Continued)

*Primary Examiner* — Ann J Lo
*Assistant Examiner* — Saba Ahmed
(74) *Attorney, Agent, or Firm* — Ryan, Mason & Lewis, LLP

(57) ABSTRACT

Methods, systems, and computer program products for self-supervision in table question answering are provided herein. A computer-implemented method includes obtaining a table comprising a plurality of entries, wherein each entry corresponds to a particular column and particular row of the table; identifying one or more of the entries in the table that correspond to a target answer of a natural language query; generating an intermediate representation of the table comprising the rows corresponding to the identified one or more entries, wherein the intermediate representation masks each of the identified one or more entries; and generating a set of natural language question and answer pairs based on the intermediate representation.

20 Claims, 9 Drawing Sheets

(51) Int. Cl.
*G06F 40/20* (2020.01)
*G06N 20/00* (2019.01)

(58) Field of Classification Search
USPC .......................................................... 707/728
See application file for complete search history.

(56) References Cited

U.S. PATENT DOCUMENTS

| | | | | |
|---|---|---|---|---|
| 2016/0180217 | A1* | 6/2016 | Boston | G06F 16/248 706/46 |
| 2016/0358072 | A1* | 12/2016 | Hermann | G06F 3/0484 |
| 2018/0150607 | A1* | 5/2018 | MacLeod | G16H 10/20 |
| 2018/0157990 | A1 | 6/2018 | Allen et al. | |
| 2018/0204136 | A1 | 7/2018 | Boxwell et al. | |
| 2019/0155904 | A1 | 5/2019 | Santos Moraes et al. | |
| 2020/0073984 | A1 | 3/2020 | Sen et al. | |
| 2020/0243174 | A1* | 7/2020 | Burgess | G06V 30/40 |
| 2020/0342051 | A1 | 10/2020 | Ghatage et al. | |
| 2021/0082425 | A1* | 3/2021 | Johnson | G06N 5/04 |
| 2021/0133162 | A1 | 5/2021 | Arnold et al. | |
| 2021/0224332 | A1* | 7/2021 | Shekhar | G06N 3/08 |
| 2021/0303557 | A1* | 9/2021 | Pike | G06F 16/2425 |
| 2021/0334206 | A1* | 10/2021 | Colgrove | G06F 3/0638 |
| 2021/0342548 | A1* | 11/2021 | Galitsky | G06F 40/253 |

OTHER PUBLICATIONS

Lewis P, Denoyer L, Riedel S., "Unsupervised question answering by cloze translation", arXiv preprint arXiv:1906.04980. Jun. 12, 2019.

Laha, Anirban, et al. "Scalable micro-planned generation of discourse from structured data." Computational Linguistics 45.4, Jan. 2020, 737-763.

Min, Sewon, et al. "A discrete hard EM approach for weakly supervised question answering." arXiv preprint arXiv:1909.04849, Sep. 2019.

Agarwal, Rishabh, et al. "Learning to generalize from sparse and underspecified rewards." International Conference on Machine Learning. PMLR, May 2019.

Liang, Chen, et al. "Memory augmented policy optimization for program synthesis and semantic parsing." arXiv preprint arXiv:1807.02322, Jul. 2018.

Liang, Chen, et al. "Neural symbolic machines: Learning semantic parsers on freebase with weak supervision." arXiv preprint arXiv:1611.00020, Oct. 2016.

Herzig, Jonathan, et al. "Tapas: Weakly supervised table parsing via pre-training." arXiv preprint arXiv:2004.02349, Apr. 2020.

Wang Y, Berant J, Liang P., "Building a semantic parser overnight." In Proceedings of the 53rd Annual Meeting of the Association for Computational Linguistics and the 7th International Joint Conference on Natural Language Processing (vol. 1: Long Papers), Jul. 2015, pp. 1332-1342).

Dasigi, Pradeep, et al. "Iterative search for weakly supervised semantic parsing." Proceedings of the 2019 Conference of the North American Chapter of the Association for Computational Linguistics: Human Language Technologies, vol. 1, Jun. 2019.

Sun, Yibo, et al. "Neural semantic parsing in low-resource settings with back-translation and meta-learning." Proceedings of the AAAI Conference on Artificial Intelligence. vol. 34. No. 05, Apr. 2020.

IBM: List of IBM Patents or Patent Applications Treated as Related, Jan. 12, 2023, pp. 1-2.

Wang et al., IEEE Transactions on Visualization and Computer Graphics, DataShot: Automatic Generation of Fact Sheets from Tabular Data, Aug. 19, 2019.

Vakulenko et al., TableQA: Question Answering on Tabular Data, Nov. 12, 2019.

IP.com, System and Method to create a Platform for Model Comparison and Factsheet Recommendations, Nov. 12, 2019.

IP.com, A self-diagnosing question answering system, Aug. 17, 2016.

*Pasupat et al., "Inferring logical forms from denotations", Proceedings of the 54th Annual Meeting of the Association for Computational Linguistics, Aug. 7-12, 2016, pp. 23-32.

* cited by examiner

| Year | Winning Team | Winning Captain | Goals Scored |
|---|---|---|---|
| 1994 | Brazil | Dunga | 0 |
| 1998 | France | Deschamps | 3 |
| 2002 | Brazil | Cafu | 2 |
| 2006 | Italy | Cannavaro | 1 |

| Year | Winning Team | Winning Captain | Goals Scored |
|---|---|---|---|
| 1994 | Brazil | | 0 |
| 1998 | France | Deschamps | 3 |
| 2002 | Brazil | Cafu | 2 |
| 2006 | Italy | Cannavaro | 1 |

| Year | Venue | Position | Event | Time |
| --- | --- | --- | --- | --- |
| 2001 | Hungary | 2nd | 400m | 47.12 |
| 2003 | Finland | 1st | 400m | 46.69 |
| 2005 | Germany | 11th | 400m | 46.62 |
| 2007 | Thailand | 1st | Relay | 182.05 |
| 2008 | China | 7th | Relay | 180.32 |

SELF-SUPERVISION IN TABLE QUESTION ANSWERING

BACKGROUND

The present application generally relates to information technology and, more particularly, to natural language (NL) processing.

Generally, NL processing pertains to interactions between a computer and human language. For example, in NL question and answer systems, a computer attempts to determine an answer to a human language question. Training such systems requires a large amount of labeled data in order to obtain a model that produces adequate results across a broad range of queries. Generating training data from documents or files that include tables is challenging as the table data often includes numerical values, trends, and contextual information that are difficult to parse.

SUMMARY

In one embodiment of the present disclosure, techniques for self-supervision in table question answering are provided. An exemplary computer-implemented method includes obtaining a table comprising a plurality of entries, wherein each entry corresponds to a particular column and particular row of the table; identifying one or more of the entries in the table that correspond to a target answer of a natural language query; generating an intermediate representation of the table comprising the rows corresponding to the identified one or more entries, wherein the intermediate representation masks each of the identified one or more entries; and generating a set of natural language question and answer pairs based on the intermediate representation.

Another embodiment of the present disclosure or elements thereof can be implemented in the form of a computer program product tangibly embodying computer readable instructions which, when implemented, cause a computer to carry out a plurality of method steps, as described herein. Furthermore, another embodiment of the present disclosure or elements thereof can be implemented in the form of a system including a memory and at least one processor that is coupled to the memory and configured to perform noted method steps. Yet further, another embodiment of the present disclosure or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present disclosure will become apparent from the following detailed description of illustrative embodiments thereof, which is to be read in connection with the accompanying drawings.

DETAILED DESCRIPTION

Question and answer systems include systems configured to process NL queries over tabular data. Generally, given a table and a NL question, such systems find an answer to the NL question from the table. TableQA is an example of one such system, and its work can be categorized into two groups, intermediate forms (referred to as logical forms (LFs)) and cell(s) prediction. Typically, LFs are in the form of Lambda Calculus, Lambda DC, QDMR, SQL, etc., and the task of TableQA is a machine translation problem for a NL LF and an execution of LF over a table. For cell(s) prediction, the problem is to train end-to-end neural models that can predict the correct cell(s) of a table to answer an NL query over a table. One approach includes predicting the row and column separately and then considering the intersection to produce the answer.

Existing question and answer systems are inefficient as they require large amounts of labeled training data, and are not suitable for transfer learning as they are generally trained on a specific domain.

Exemplary techniques described herein provide improved training techniques for such systems, including self-supervised, domain-specific training by generating table specific Q-A pairs, even in the absence of domain specific training data, for example. As described herein, one or more example embodiments include a system that generates table specific question-answer pairs for self-supervision in table-based question and answer systems. An example embodiment may further include generating doze representations for cell(s) of a table. At least one example embodiment includes generating NL questions from a tabular doze representation. Typically, a "doze" representation is a technique that removes one or more words from a sentence (or text passage). The sentence is then presented to a learner who provides the missing words to complete the sentence. In the context of the present disclosure, a tabular doze representation generally refers to a representation of a table, where one or more elements are masked (e.g., removed, hidden, etc.).

Figure 1:
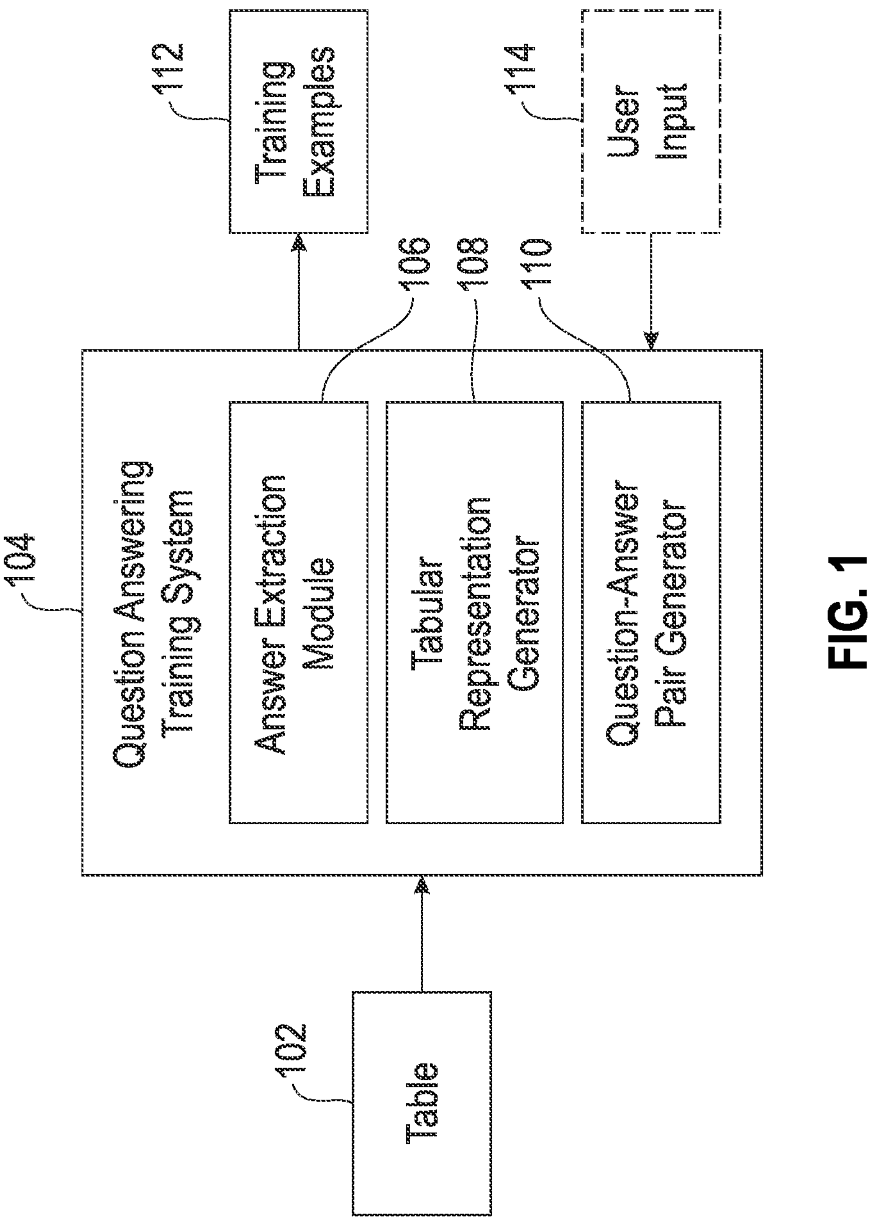
FIG. 1 is a diagram illustrating a system architecture in accordance with exemplary embodiments.

FIG. 1 is a diagram illustrating a system architecture in accordance with exemplary embodiments. By way of illustration, FIG. 1 depicts a question answering training system 104, that includes an answer extraction module 106, a tabular representation generator 108, and a question-answer pair generator 110. In the FIG. 1 example the question answering training system 104 obtains a table 102, such as a table in a digital format. The answer extraction module 106 samples one or more cells (or aggregation of cells) from the table to identify one or more answer cells. The tabular representation generator 108 generates one or more doze rows for the corresponding answer cells. The question-answer pair generator 110 generates training examples 112 based on the tabular doze representation generated by the tabular representation generator 108. For example, the training examples 112 may include NL questions and be output by the question answering training system 104. The training examples 112 are then used to train a NL question answering system over the table 102.

Optionally, the question answering training system 104 is configurable by a subject matter expert (SME) based on user input 114, for example. For instance, the training examples 112 may be output to a file, and the SMEs may be provided read and/or write access to the file (e.g., based on an application programming interface). In such examples, the user input 114 may include at least one of, for example, paraphrases of generated questions with better domain specific utterances and domain specific vocabulary words for certain column headers and/or data points. The question answering training system 104 may then re-generate the training examples 112 based at least in part on the user input 114. The training examples 112 may include additional question and answer pairs, for example, which considers the SME-specific edits and/or additions. Additionally, the SME-provided questions may be paraphrased to form more equivalent question and answer pairs. Further, in some example embodiments, the SME provided vocabulary is re-used in other questions to generate a diverse category of question and answer pairs with the SME-provided vocabulary.

Figure 2:
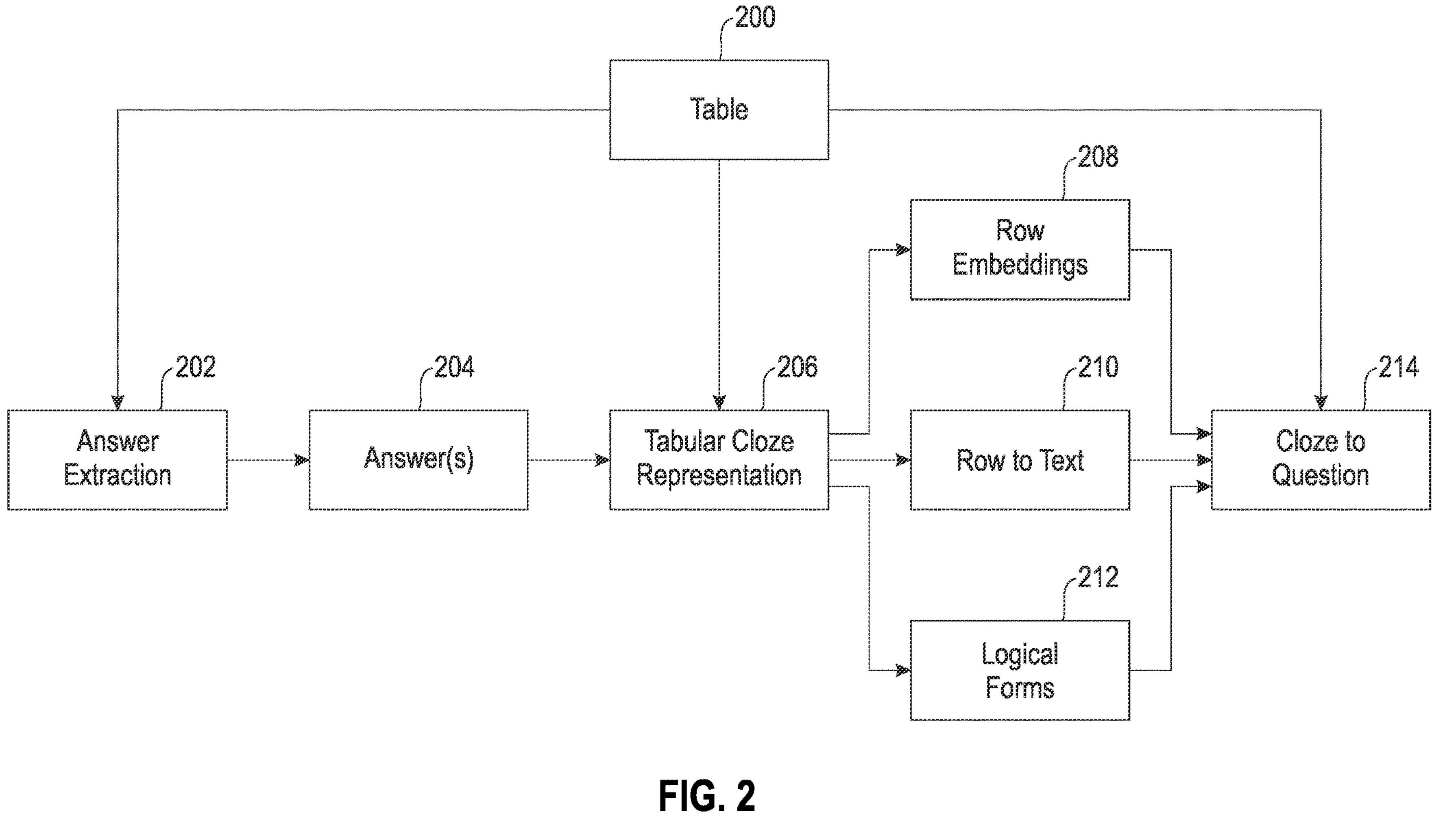
FIG. 2 is a process flow diagram in accordance with exemplary embodiments.

FIG. 2 is an example system diagram in accordance with exemplary embodiments. The system diagram in FIG. 2 includes a table 200, which may comprise columns and rows of data (e.g., text, numerical values, etc.). An answer extraction process is applied to the table 200, as indicated by block 202, which results in one or more target answers 204. The answer extraction 202 may include sampling one or more specific cells (or an aggregation of cells) in the table 200, for example. A tabular doze representation 206 is generated based on the table 200 and the extracted answer(s) 204. The tabular doze representation 206 may comprise, for example, rows from the table 200 having cells corresponding to the answer 204 that are masked. Each row in the tabular doze representation 206 is then converted to at least one of the following representations: row embedding 208, row to text representations 210, and logical forms 212. The representations 208, 210, and 212 may then be used, along with the table 200, to generate NL questions in as depicted by block 214.

Figure 3:
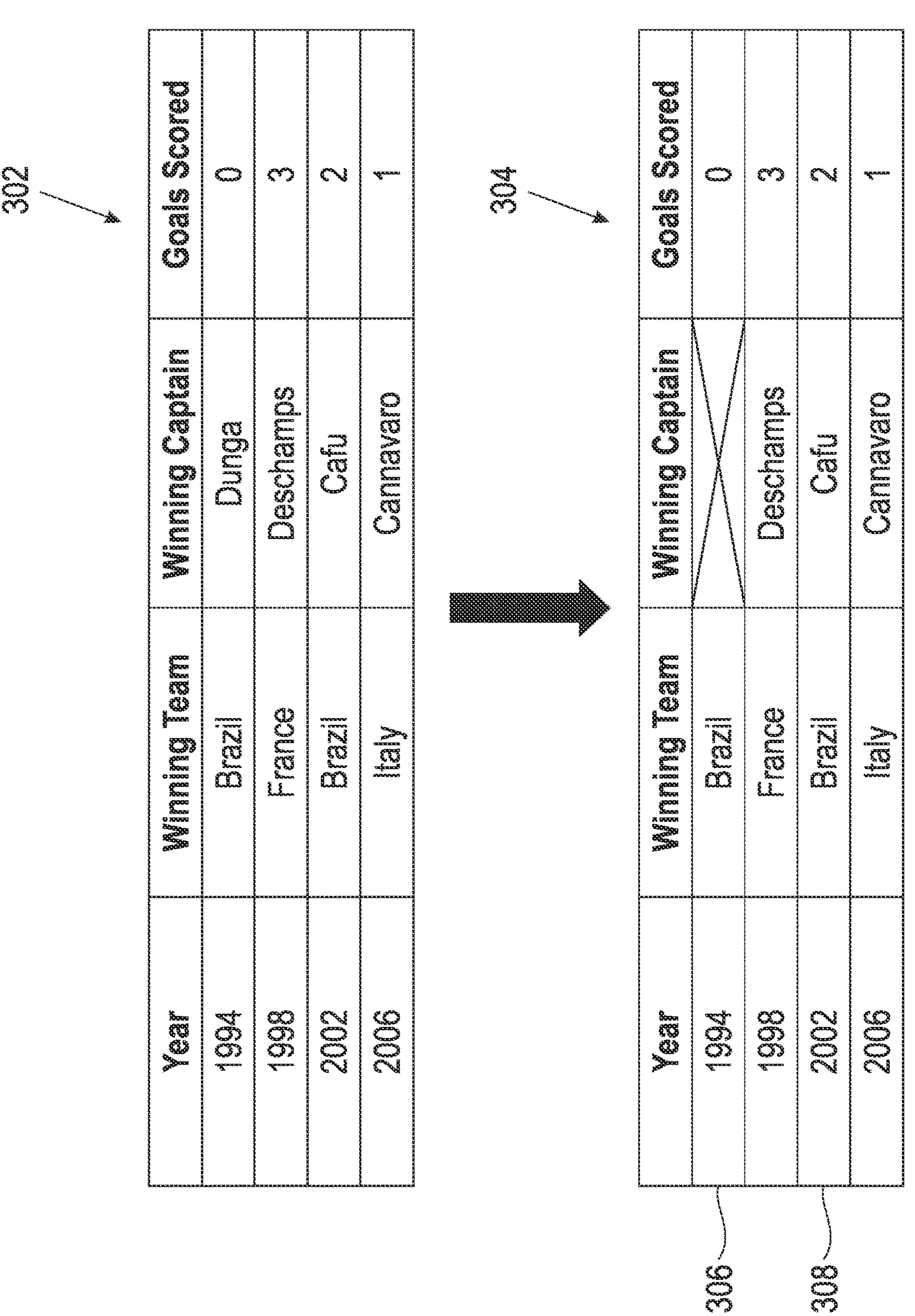
FIG. 3 is an example of a data table in accordance with exemplary embodiments.

Referring also to FIG. 3, this figure shows an example of a data table 302 and a doze version of the data table 304 in accordance with exemplary embodiments. More specifically, the data table 302 corresponds to statistics for different years of the World Cup. If the data table is to be used to train a question and answer system, then one candidate target answer from the table 302 is "Dunga." Given this target answer, a cloze version of the data table 304 can be generated that masks this answer as shown indicated by crossed out cell in row 306. One or more embodiments include generating pairs of natural questions and answers based on the doze version of the data table 304. For example, a NL question for row 306 may be: "Who was Brazil's captain for the world cup win in 1994?" and the corresponding answer may be "Dunga."

At least some example embodiments can also avoid generating "improper" questions for a given row by considering other rows from the data table 302 when generating the question-answer pairs. By way of example, row 306 and row 308 in the doze version of the data table 304 both indicate Brazil in the winning team column. Given this information, the following question would be ambiguous, "Who was the Brazil's captain for world cup win?" as both Dunga and Cafu are possible answers. Additionally, one or more embodiments may include extracting relevant text paragraphs or captions of tables, if available, to further augment and enrich the doze representation.

According to one embodiment, NL queries are generated based on a doze cell of a data table (e.g., the masked cell in row 306). For example, a select-project-join (SPJ) query may be generated based on the doze cell, and a row-to-text translation process can then be applied to the rows containing the columns associated with the SPJ query. A table-to-text process (such as Table2text, for example) is applied for sentence generation. A similar approach is followed to create an NL query for the doze cell from the sentence or bidirectional encoder representations from transformers (BERT)-based row representations. At least one example embodiment implements exploration and/or pruning techniques on the subset of features for the filter (column) identification (e.g., decision tree based techniques, rough set based techniques, etc.) For example, different columns of a row may be explored to create a filter that uniquely identifies the corresponding row of the SPJ query. The exploration may be programmatic (e.g., iterating over all possible columns in that row and their filter values), or through an intelligent algorithm (such as, for example, a rough set algorithm, which outputs the possible column-value pairs to uniquely identify the row).

Figure 4:
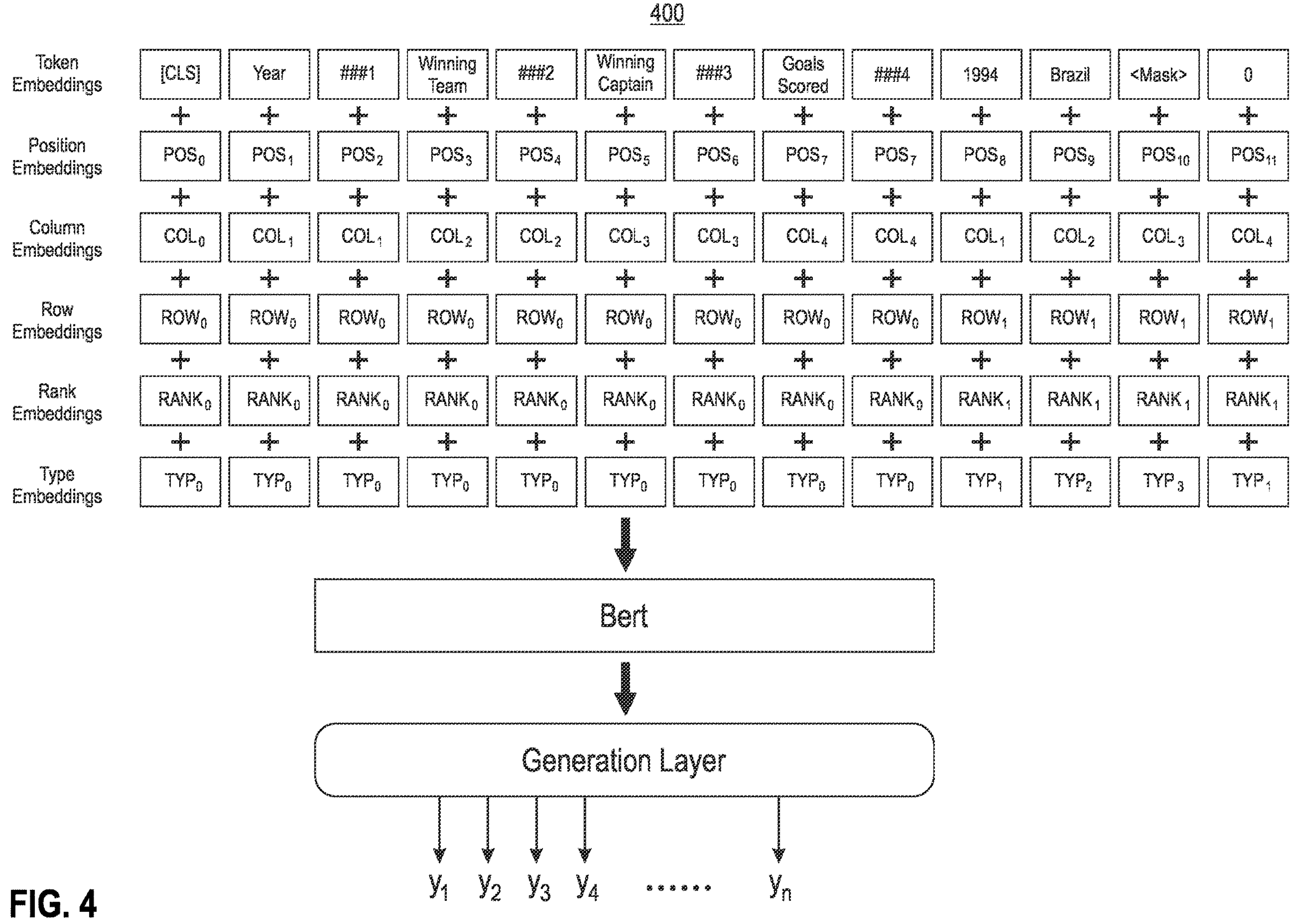
FIG. 4 is a diagram illustrating a process for generating NL queries in accordance with exemplary embodiments.

FIG. 4 is a diagram illustrating a process 400 for generating NL queries in accordance with exemplary embodiments. In this example, the NL query is generated from row 306 of FIG. 3. Specifically, various embeddings are created based on the row 306, including token embeddings, position embeddings, column embeddings, row embeddings, rank embeddings, and type embeddings, as depicted in FIG. 4. The encoded doze representation is provided to a BERT layer as input to obtain a contextual representation. The generation layer generates a NL question using the contextual representation from the BERT layer.

Figure 5:
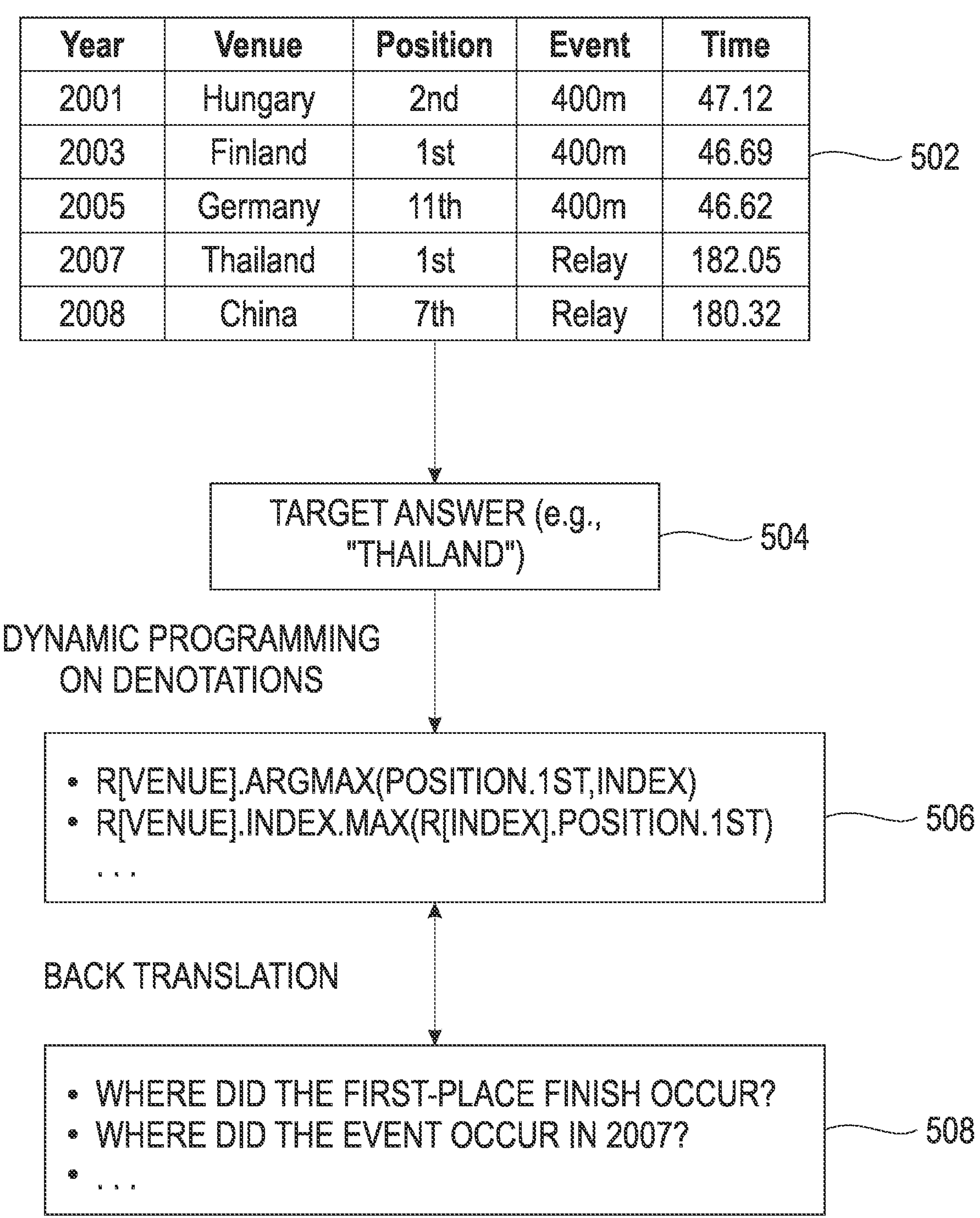
FIG. 5 is a diagram illustrating another process for techniques for generating NL queries in accordance with exemplary embodiments.

Referring now to FIG. 5, this illustrates a process for generating NL queries in accordance with exemplary embodiments. A target answer 504 is identified from table 502, which, in this example, is assumed to be "Thailand." Given the table 502 and the target answer 504, a dataset of logical forms 506, which when applied on the table 502 provide the target answer 504. The logical forms 506 are generated using, for example, a dynamic programming on denotations technique. Another dataset of natural questions 508 is created, and a back translation is then applied to create a machine translator to translate between the NL questions 508 and the logical forms 506. It is noted that, in at least one embodiment, the dataset of questions 508 does not include the answers or logical forms of the questions. Question-answer pairs can then be generated in a similar manner described elsewhere herein.

In at least some embodiments, a plurality of candidate NL questions may be generated for a given input table such that one or more or aggregates of elements in the table form possible answers. For instance, the table may first deconstructed row-by-row into a canonical representation of the information in the table. An answer may then be replaced by a mask, creating a doze sub-table or row, such as by applying a named entity tagging technique. Triples are then generated in a generic form (with named entities tagged) that are used to generate sentences either based on one or more rule-based templates or based on one or more NL generation models, for example.

Figure 6:
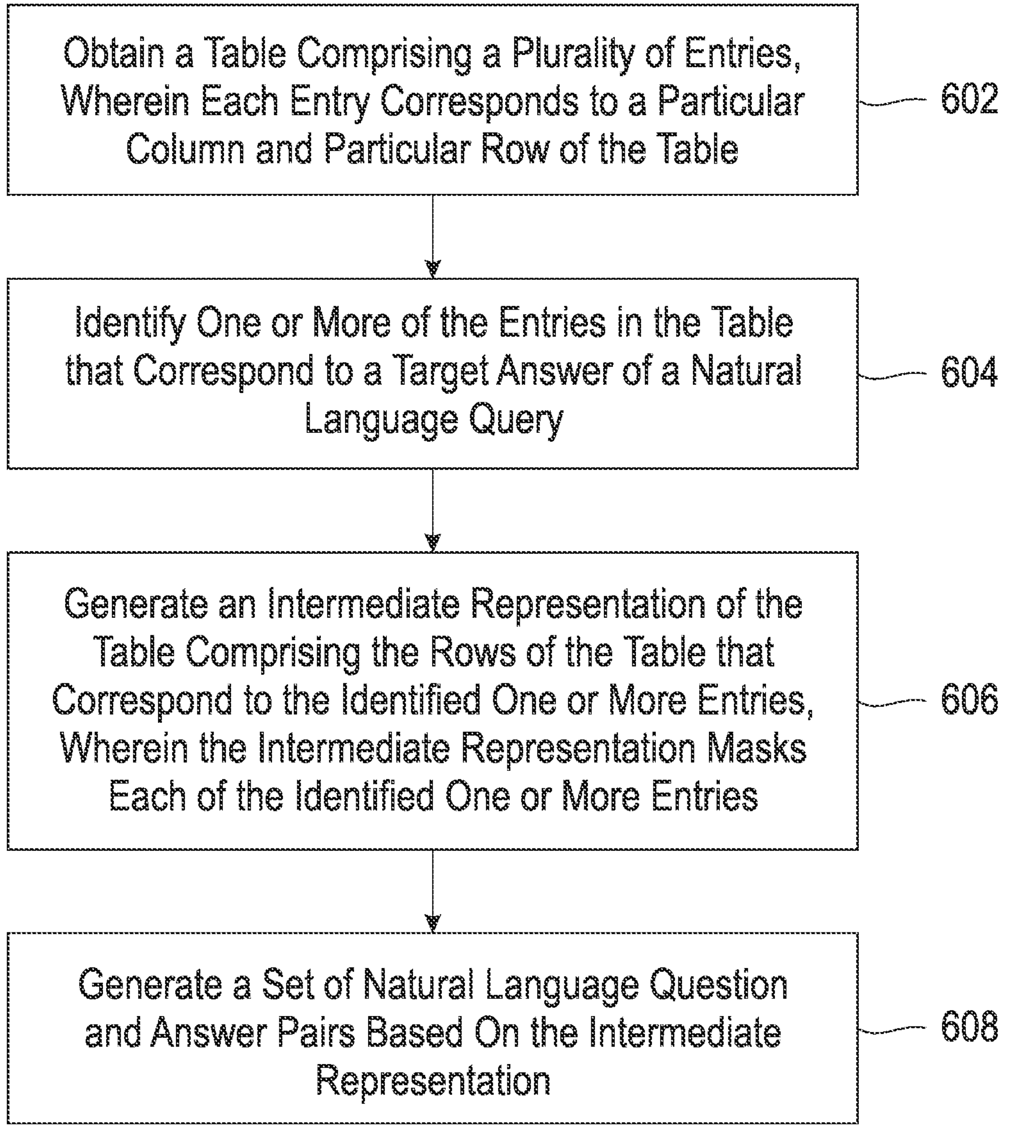
FIG. 6 is a flow diagram illustrating techniques in accordance with exemplary embodiments.

FIG. 6 is a flow diagram illustrating techniques in accordance with exemplary embodiments. Step 602 includes obtaining a table comprising a plurality of entries, wherein each entry corresponds to a particular column and particular row of the table. Step 604 includes identifying one or more of the entries in the table that correspond to a target answer of a natural language query. Step 606 includes generating an intermediate representation of the table comprising the rows corresponding to the identified one or more entries, wherein the intermediate representation masks each of the identified one or more entries. Step 608 includes generating a set of natural language question and answer pairs based on the intermediate representation.

The steps in FIG. 6 may include using the set of natural language question and answer pairs to train a machine learning model. In at least some embodiments, the steps may include providing access to the set of natural language question and answer pairs to at least one user via an application programming interface.

The steps may include obtaining feedback from the user comprising at least one of: one or more additional natural language question and answer pairs and one or more edits to at least one of the generated natural language question and answer pairs; and updating the set of natural language pairs based at least in part on the feedback. Generating the intermediate representation of the table may include generating a row embedding for each of the rows that corresponds to the identified one or more entries. The intermediate representation may include a bidirectional encoder representations from transformers (BERT) representation. Generating the intermediate representation may include generating a logical form for each of the rows that correspond to the identified one or more entries. Generating the intermediate representation of the table may include applying a back-translation process to create a machine translator for translating between natural language and a given logical form.

The techniques depicted in FIG. 6 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the present disclosure, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 6 can be implemented via a computer program product that can include computer useable program code that is stored in a computer readable storage medium in a data processing system, and wherein the computer useable program code was downloaded over a network from a remote data processing system. Also, in an embodiment of the present disclosure, the computer program product can include computer useable program code that is stored in a computer readable storage medium in a server data processing system, and wherein the computer useable program code is downloaded over a network to a remote data processing system for use in a computer readable storage medium with the remote system.

An exemplary embodiment or elements thereof can be implemented in the form of an apparatus including a memory and at least one processor that is coupled to the memory and configured to perform exemplary method steps.

Figure 7:
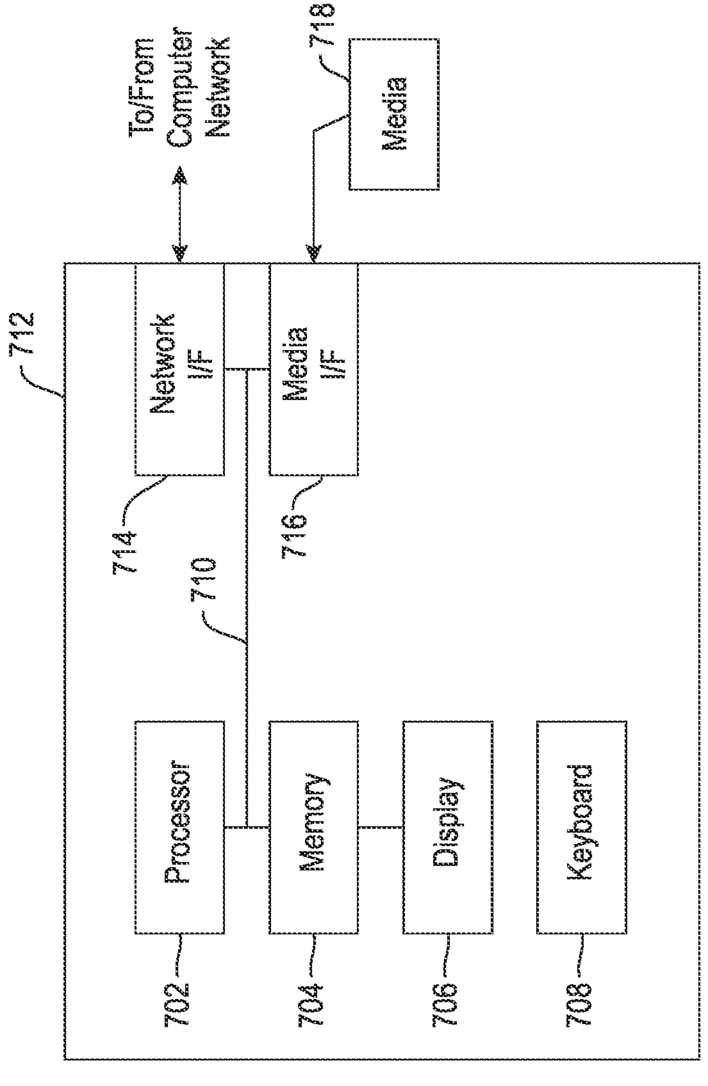
FIG. 7 is a system diagram of an exemplary computer system on which at least one embodiment of the present disclosure can be implemented.

Additionally, an embodiment of the present disclosure can make use of software running on a computer or workstation. With reference to FIG. 7, such an implementation might employ, for example, a processor 702, a memory 704, and an input/output interface formed, for example, by a display 706 and a keyboard 708. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 702, memory 704, and input/output interface such as display 706 and keyboard 708 can be interconnected, for example, via bus 710 as part of a data processing unit 712. Suitable interconnections, for example via bus 710, can also be provided to a network interface 714, such as a network card, which can be provided to interface with a computer network, and to a media interface 716, such as a diskette or CD-ROM drive, which can be provided to interface with media 718.

Accordingly, computer software including instructions or code for performing the methodologies of the present disclosure, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 702 coupled directly or indirectly to memory elements 704 through a system bus 710. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 708, displays 706, pointing devices, and the like) can be coupled to the system either directly (such as via bus 710) or through intervening I/O controllers (omitted for clarity).

Network adapters such as network interface 714 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 712 as shown in FIG. 7) running a server program. It will be understood that such a physical server may or may not include a display and keyboard.

An exemplary embodiment may include a system, a method, and/or a computer program product at any possible technical detail level of integration. The computer program product may include a computer readable storage medium (or media) having computer readable program instructions thereon for causing a processor to carry out exemplary embodiments of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present disclosure.

Embodiments of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 702. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings provided herein, one of ordinary skill in the related art will be able to contemplate other implementations of the components.

Additionally, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
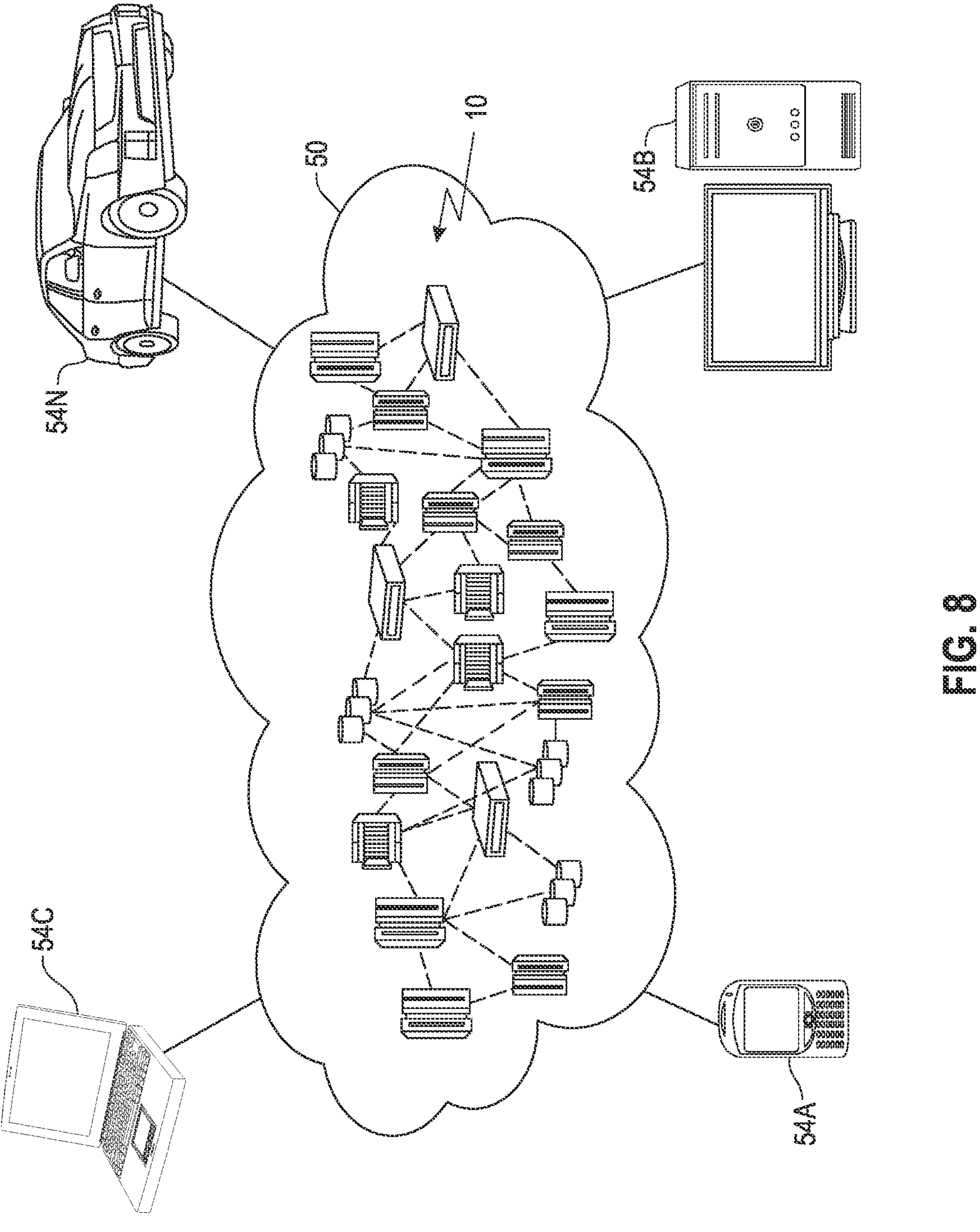
FIG. 8 depicts a cloud computing environment in accordance with exemplary embodiments.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
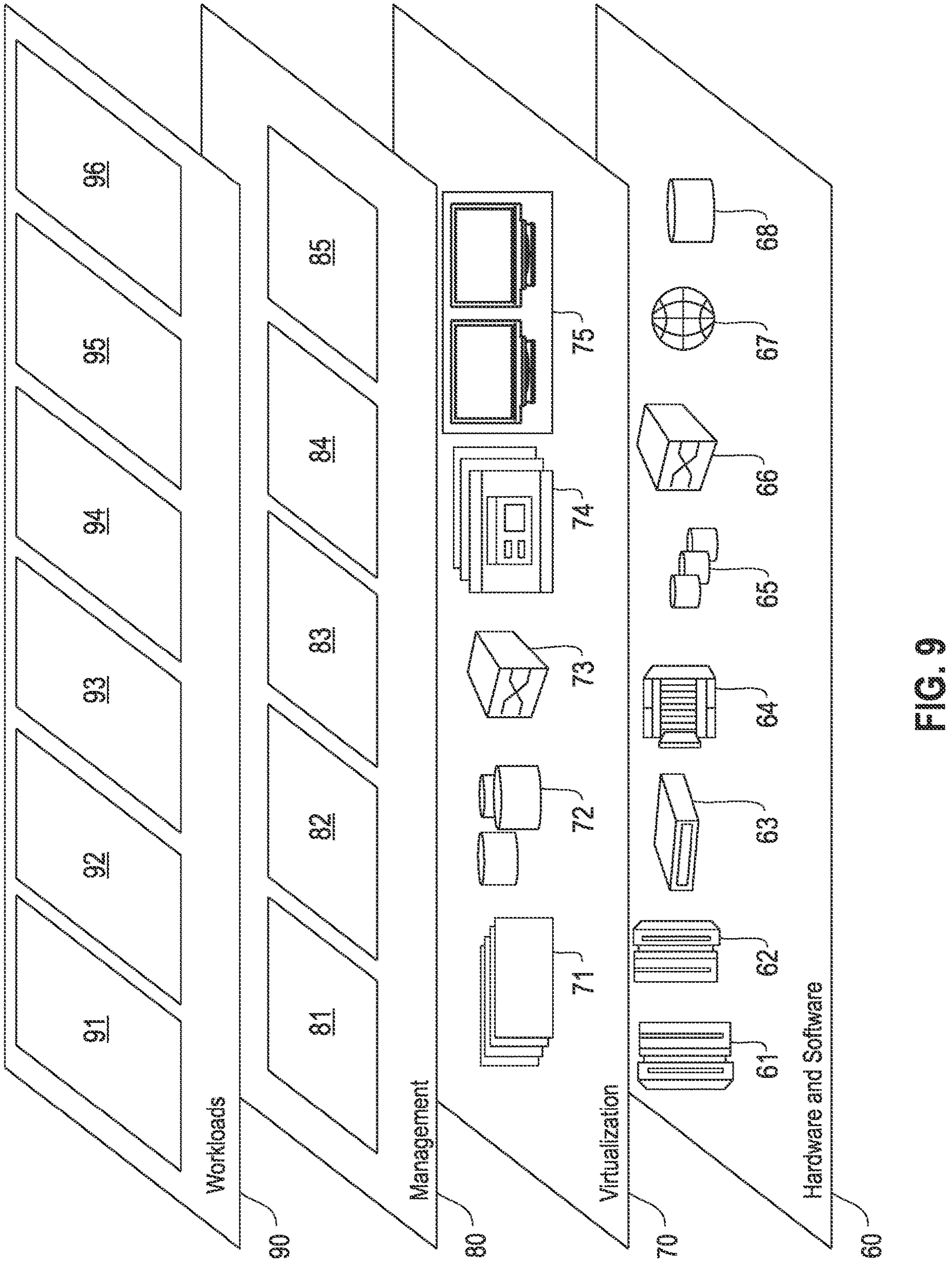
FIG. 9 depicts abstraction model layers in accordance with exemplary embodiments.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and self-supervision in table question answering 96, in accordance with the one or more embodiments of the present disclosure.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present disclosure may provide a beneficial effect such as, for example, enabling transfer learning of NL models to new domains without requiring specific manual annotations and/or to regularize a NL model that is trained with limited data.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:

obtaining a table comprising a plurality of entries, wherein each entry corresponds to a particular column and particular row of the table;

identifying one or more of the entries in the table that correspond to a target answer of a natural language query;

generating an intermediate representation of the table comprising the rows corresponding to the identified one or more entries, wherein the intermediate representation masks each of the identified one or more entries;

generating, for at least the masked entries in the intermediate representation, a set of natural language question and answer pairs, wherein generating a first natural language question and answer pair in the set of natural language question and answer pairs comprises: generating a combined embedding for a first masked entry by combining a plurality of distinct embedding types, wherein the distinct embedding types comprise at least token embeddings, column embeddings, and row embeddings for a first row associated with the first masked entry;

generating a first natural language question for a first one of the masked entries, that, when answered using the table, results in the first masked entry being an answer to the first natural language question, wherein an encoder-based transformer layer of a machine learning framework generates contextual information from the combined embedding, and wherein the first natural language question is generated by a generation layer of the machine learning framework using the contextual information as input;

determining a vocabulary for at least one domain based at least in part on the set of natural language question and answer pairs and feedback responsive to the generated set of natural language question and answer pairs;

regenerating the set of natural language question and answer pairs based on the determined vocabulary; and using the regenerated set of natural language question and answer pairs to train a machine learning model;

wherein the method is carried out by at least one computing device.

2. The computer-implemented method of claim 1, comprising:

providing access to the set of natural language question and answer pairs generated for the masked entries to at least one user via an application programming interface.

3. The computer-implemented method of claim 1, wherein the regenerating comprises:

expanding the set of natural language question and answer pairs generated for the masked entries based on the vocabulary for the at least one domain corresponding to the table, wherein the feedback comprises at least one of: one or more additional natural language question and answer pairs and one or more edits to at least one of the generated natural language question and answer pairs.

4. The computer-implemented method of claim 1, wherein the intermediate representation comprises a bidirectional encoder representations from transformers representation.

5. The computer-implemented method of claim 1, wherein generating the intermediate representation comprises:

generating a logical form for each of the rows that correspond to the identified one or more entries.

6. The computer-implemented method of claim 5, wherein said generating the intermediate representation of the table comprises:

applying a back-translation process to create a machine translator for translating between natural language and a given logical form.

7. A computer program product comprising a computer readable storage medium having program instructions embodied therewith, the program instructions executable by a computing device to cause the computing device to:

obtain a table comprising a plurality of entries, wherein each entry corresponds to a particular column and particular row of the table;

identify one or more of the entries in the table that correspond to a target answer of a natural language query;

generate an intermediate representation of the table comprising the rows corresponding to the identified one or more entries, wherein the intermediate representation masks each of the identified one or more entries;

generate, for at least the masked entries in the intermediate representation, a set of natural language question and answer pairs, wherein generating a first natural language question and answer pair in the set of natural language question and answer pairs comprises: generating a combined embedding for a first masked entry by combining a plurality of distinct embedding types, wherein the distinct embedding types comprise at least token embeddings, column embeddings, and row embeddings for a first row associated with the first masked entry;

generate a first natural language question for a first one of the masked entries, that, when answered using the table, results in the first masked entry being an answer to the first natural language question, wherein an encoder-based transformer layer of a machine learning framework generates contextual information from the combined embedding, and wherein the first natural language question is generated by a generation layer of the machine learning framework using the contextual information as input;

determine a vocabulary for at least one domain based at least in part on the set of natural language question and answer pairs and feedback responsive to the generated set of natural language question and answer pairs;

regenerate the set of natural language question and answer pairs based on the determined vocabulary; and use the regenerated set of natural language question and answer pairs to train a machine learning model.

8. The computer program product of claim 7, wherein the program code is executable by the computing device to cause the computing device to:

provide access to the set of natural language question and answer pairs generated for the masked entries to at least one user via an application programming interface.

9. The computer program product of claim 7, wherein the regenerating comprises:

expanding the set of natural language question and answer pairs generated for the masked entries based on the vocabulary for the at least one domain corresponding to the table, wherein the feedback comprises at least one of: one or more additional natural language question and answer pairs and one or more edits to at least one of the generated natural language question and answer pairs.

10. The computer program product of claim 7, wherein the intermediate representation comprises a bidirectional encoder representations from transformers representation.

11. The computer program product of claim 7, wherein generating the intermediate representation comprises:

generating a logical form for each of the rows that correspond to the identified one or more entries.

12. The computer program product of claim 11, wherein said generating the intermediate representation of the table comprises:

applying a back-translation process to create a machine translator for translating between natural language and a given logical form.

13. A system comprising:

a memory configured to store program instructions; and a processor operatively coupled to the memory to execute the program instructions to:

obtain a table comprising a plurality of entries, wherein each entry corresponds to a particular column and particular row of the table;

identify one or more of the entries in the table that correspond to a target answer of a natural language query;

generate, for at least the masked entries in the intermediate representation, a set of natural language question and answer pairs, wherein generating a first natural language question and answer pair in the set of natural language question and answer pairs comprises: generating a combined embedding for a first masked entry by combining a plurality of distinct embedding types, wherein the distinct embedding types comprise at least token embeddings, column embeddings, and row embeddings for a first row associated with the first masked entry;

generate a first natural language question for a first one of the masked entries, that, when answered using the table, results in the first masked entry being an answer to the first natural language question, wherein an encoder-based transformer layer of a machine learning framework generates contextual information from the combined embedding, and wherein the first natural language question is generated by a generation layer of the machine learning framework using the contextual information as input;

determine a vocabulary for at least one domain based at least in part on the set of natural language question and answer pairs and feedback responsive to the generated set of natural language question and answer pairs;

regenerate the set of natural language question and answer pairs based on the determined vocabulary; and use the regenerated set of natural language question and answer pairs to train a machine learning model.

14. The system of claim 13, wherein the processor is operatively coupled to the memory to execute the program instructions to:

provide access to the set of natural language question and answer pairs generated for the masked entries to at least one user via an application programming interface.

15. The computer-implemented method of claim 1, wherein the set of natural language question and answer pairs is generated for the masked entries based at least in part on one or more portions of extracted text associated with the table, and wherein the extracted text corresponds to a caption of the table.

16. The system of claim 13, wherein the regenerating comprises:

expanding the set of natural language question and answer pairs generated for the masked entries based on the vocabulary for the at least one domain corresponding to the table, wherein the feedback comprises at least one of: one or more additional natural language question and answer pairs and one or more edits to at least one of the generated natural language question and answer pairs.

17. The computer-implemented method of claim 1, wherein the at least one domain comprises a first domain that is different than a second domain corresponding to the table, and wherein the machine learning model is trained to respond to one or more user queries related to the first domain.

18. The computer program product of claim 7, wherein the set of natural language question and answer pairs is generated for the masked entries based at least in part on one or more portions of extracted text associated with the table, and wherein the extracted text corresponds to a caption of the table.

19. The system of claim 13, wherein the set of natural language question and answer pairs is generated for the masked entries based at least in part on one or more portions of extracted text associated with the table, and wherein the extracted text corresponds to a caption of the table.

20. The system of claim 13, wherein generating the intermediate representation comprises:

generating a logical form for each of the rows that correspond to the identified one or more entries.

* * * * *